United States Patent
Fregly et al.

(10) Patent No.: US 11,321,420 B1
(45) Date of Patent: May 3, 2022

(54) UNIVERSAL SERVICE INTERFACES FOR WEBSITES

(71) Applicant: VERISIGN, INC., Reston, VA (US)

(72) Inventors: Andrew Fregly, Leesburg, VA (US); Paul Tidwell, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 75 days.

(21) Appl. No.: 16/230,970

(22) Filed: Dec. 21, 2018

(51) Int. Cl.
| | |
|---|---|
| *G06F 40/186* | (2020.01) |
| *G06F 16/958* | (2019.01) |
| *G06F 16/957* | (2019.01) |
| *H04L 67/567* | (2022.01) |
| *H04L 41/50* | (2022.01) |
| *H04L 67/01* | (2022.01) |
| *H04L 61/3015* | (2022.01) |
| *G06F 3/16* | (2006.01) |
| *H04L 41/5041* | (2022.01) |
| *H04L 67/563* | (2022.01) |

(52) U.S. Cl.
CPC ............ *G06F 16/972* (2019.01); *G06F 3/167* (2013.01); *G06F 16/9577* (2019.01); *G06F 40/186* (2020.01); *H04L 41/5041* (2013.01); *H04L 41/5083* (2013.01); *H04L 61/3025* (2013.01); *H04L 67/2814* (2013.01); *H04L 67/2838* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2007/0250783 | A1* | 10/2007 | Wu ....................... | G06F 40/174 715/762 |
| 2008/0066080 | A1* | 3/2008 | Campbell ............. | G06F 16/958 719/314 |
| 2012/0233235 | A1* | 9/2012 | Allaire ..................... | G06F 8/61 709/201 |
| 2012/0254791 | A1* | 10/2012 | Jackson .............. | G06F 3/04815 715/781 |
| 2015/0007022 | A1* | 1/2015 | Chen ..................... | G06F 3/0482 715/235 |
| 2016/0063416 | A1* | 3/2016 | Sharma ................. | G06F 40/186 705/7.23 |
| 2020/0110792 | A1* | 4/2020 | Tsabba .................... | G06F 40/14 |

* cited by examiner

*Primary Examiner* — Ariel Mercado
(74) *Attorney, Agent, or Firm* — Baker Botts L.L.P.; Michael A. Sartori (57) ABSTRACT

Techniques for providing a cross-ecosystem website for applications are presented. The techniques can include storing, by a webserver, multiple website templates in association with a plurality of respective web widgets and a respective Application Program Interface (API), where a plurality of respective back-end services correspond to the plurality of respective web widgets; receiving, from a website developer, a website template selection and a web widget selection; implementing a respective API for the cross-ecosystem website; storing in association with the cross-ecosystem website a manifest indicating services available on the cross-ecosystem website; and interfacing with a plurality of applications in a plurality of application ecosystems, using the API for the cross-ecosystem website.

19 Claims, 4 Drawing Sheets

UNIVERSAL SERVICE INTERFACES FOR WEBSITES

FIELD

This disclosure relates generally to providing an application, and more particularly to providing an application for mobile devices and/or voice assistants.

BACKGROUND

Entities that want to provide applications in application ecosystems, such as voice assistant ecosystems and mobile device application ecosystems, typically perform custom development of both front-end applications and back-end services. For example, an application ecosystem may refer to a particular platform (e.g., voice assistant, mobile device, etc.) as well as supporting infrastructure, such as the relevant application marketplace. This custom development is implemented despite the fact that the desired application functionality is similar or identical to the functionality that other entities would like to provide, such as multiple restaurants wishing to provide an application that supports ordering food and making reservations, and multiple professionals, such as doctors and lawyers, wishing to provide a client scheduling application. Once developed, applications may go through a rigorous approval process before being deployed into the application marketplace of an application ecosystem. Once in an application marketplace, the application is brought to the attention of potential users, who may decide that they want to add the application to the ever-growing collection of applications they have for a particular application ecosystem. Thus, entities wanting a presence in application ecosystems typically have significant expertise and expend significant time and money to develop applications for each application ecosystem they want a presence in. Such entities also typically develop and operate any required back-end services for their application. For small and medium businesses and individuals, for example, this is such a daunting task that many do not pursue a presence in application ecosystems, even though they might desire to do so.

The existing application development and deployment process is also onerous from the perspective of the application user. Due to the issues described above, applications might not even exist for many entities, so application users will likely not have comprehensive coverage for all the entities they would like to interact with. Even if they do get comprehensive coverage, application users would need to install many applications and then must be able to find and use those applications. Given that applications for each entity have a unique name in the application ecosystem, remembering the applications to use and finding them among a large collection of applications spread across multiple application ecosystems is confusing and laborious. This is further complicated due to each application typically having its own unique interaction model, despite providing functionality equivalent to many other applications. Even if an application user finds and installs an application, they still may not get a satisfying experience relative to their overall needs.

Some embodiments provide a solution to the issues described above in a way that is efficient for entities wanting an application presence in various application ecosystems and for application users. The approach also provides incentives for all parties involved.

SUMMARY

According to various embodiments, a method of providing a cross-ecosystem website for applications is provided. The method may include: storing, by at least one electronic persistent memory communicatively coupled to a webserver communicatively coupled to a computer network, a plurality of website templates, where each of the plurality of website templates is stored in association with a plurality of respective web widgets and a respective Application Program Interface (API), where a plurality of respective back-end services correspond to the plurality of respective web widgets; receiving, by the at least one webserver and from a website developer, a website template selection from the plurality of website templates for a cross-ecosystem website developed by the website developer, and a web widget selection from the plurality of respective web widgets for inclusion on the cross-ecosystem website; implementing, by the at least one webserver, a respective API for the cross-ecosystem website, the respective API corresponding to the website template selection; storing, by the at least one webserver, automatically and in association with the cross-ecosystem website, a manifest indicating services available on the cross-ecosystem website; and interfacing, by the cross-ecosystem website, with a plurality of applications in a plurality of application ecosystems, using the API for the cross-ecosystem website.

According to an embodiment, the method may further include the following features. The method may include providing the plurality of applications in the plurality of application ecosystems. The plurality of applications in the plurality of application ecosystems may interface with the cross-ecosystem website based on a domain name of the cross-ecosystem website obtained by the plurality of applications in the plurality of application ecosystems. Each of the plurality of applications in the plurality of application ecosystems may include a respective input for an end user to select the domain name of the cross-ecosystem website. The method may include providing a plurality of websites for a plurality of derivative domain names, the plurality of websites configured to redirect to the cross-ecosystem website. The method may include suggesting the plurality of derivative domain names to the website developer for registration. The plurality of website templates may include at least one of: a food ordering website template, an appointment scheduling website template, a shopping website template, a service ordering website template, a scheduling website template, a customer support website template, or an information request website template. The website template selection may include a food ordering website template, and the web widget selection may include a payment widget and a menu selection widget. At least one application in the plurality of applications in the plurality of application ecosystems may include a voice enabled application in a voice assistant ecosystem. The storing the manifest may include storing the manifest on the website.

According to various system embodiments, a system for providing a cross-ecosystem website for applications is presented. The system may include: at least one webserver communicatively coupled to a computer network and to at least one electronic persistent memory storing a plurality of website templates, each stored in association with a plurality of respective web widgets and a respective Application Program Interface (API), where a plurality of respective back-end services correspond to the plurality of respective web widgets; where the at least one webserver is configured to receive from a website developer a website template selection from the plurality of website templates for a cross-ecosystem website developed by the website developer, and a web widget selection from the plurality of respective web widgets for inclusion on the cross-ecosystem website, where the at least one webserver is configured to implement an API for the cross-ecosystem website, the API for the cross-ecosystem website corresponding to the website template selection, where the at least one webserver is configured to automatically electronically store in association with the cross-ecosystem website a manifest indicating services available on the cross-ecosystem website, where the cross-platform website is configured to interface, using the API for the cross-ecosystem website, with a plurality of applications in a plurality of application ecosystems, using the API for the cross-ecosystem website.

According to an embodiment, the system may further include the following features. The at least one webserver may be configured to provide the plurality of applications in the plurality of application ecosystems. The plurality of applications in the plurality of application ecosystems may be configured to interface with the cross-ecosystem website based on a domain name of the cross-ecosystem website obtained by the plurality of applications in the plurality of application ecosystems. Each of the plurality of applications in the plurality of application ecosystems may include a respective input for an end user to select the domain name of the cross-ecosystem website. The at least one webserver may be configured to provide a plurality of websites for a plurality of derivative domain names, the plurality of websites configured to redirect to the cross-ecosystem website. The system may include a name suggestion tool for providing the plurality of derivative domain names to the website developer for registration. The plurality of website templates may include at least one of: a food ordering website template, an appointment scheduling website template, a shopping website template, a service ordering website template, a scheduling website template, a customer support website template, or an information request website template. The website template selection may include a food ordering website template, and the web widget selection may include a payment widget and a menu selection widget. At least one application in the plurality of applications in the plurality of application ecosystems may include a voice enabled application in a voice assistant ecosystem. The at least one webserver may be configured to automatically electronically store the manifest on the website.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Almost any entity wishing to have an application presence in an application ecosystem will also want a website and find it desirable to have their domain name express their brand, that is, represent their brand. Accordingly, some embodiments provide, for websites, universal service interfaces for use by applications. This may allow any application that supports the universal service interfaces to interact with websites that provide such service interfaces. Note that embodiments are applicable to both applications and apps, which are a type of application. Therefore, all references to applications herein apply equally to apps.

Some embodiments provide, for each application ecosystem, functional applications, which are usable by a number of entities rather than individual applications for each entity in each application ecosystem. According to an embodiment, this may alleviate the need for entities to fully develop their own application in each ecosystem. In such embodiments, a small set of functional applications in each application ecosystem allows application users to interact with any entity that has provided the universal service interfaces used by the functional applications.

Some embodiments use domain names to identify entities that a functional application interacts with. For example, a restaurant functional application may interact with any website that provides food ordering and table reservation services. A restaurant functional application user may identify a specific restaurant by entering the domain name associated with the restaurant into the functional application. According to an embodiment, the functional application may determine the correct domain name using other information, such as, for example, but not limited to, via a search-based domain name identification, the use of keywords, explicit preference of the user (e.g., via a follow function), or based on context. Given that users are already familiar with domain names, and that domain names may be brand names or trademarks that are closely associated with an entity, this usage is natural and beneficial. Moreover, users do not have to suffer from dealing with the plethora of application names in the current application ecosystems.

The universal service interfaces used by the applications may be generated by website builder tools, such as, for example, based on provided website templates and widgets that can be placed on a website built using such a template. The widgets and/or templates may be provided by the provider of the website builder, or by third parties that, for example, consolidate services of multiple entities. Thus, the implementation of services is greatly simplified for the owner of the website. With these capabilities in place, a website owner does not need to develop their own applications for each application ecosystem. Instead, such a website owner may simply ensure that their website supports the universal service interface utilized by a functional application of interest.

Given that website hosting companies may provide the back-end services used by their website builders, such website hosting companies may configure the universal service interfaces to interact with their existing back-end services. This further simplifies the process and lowers the costs for an entity creating a presence in application ecosystems, at least because they do not have to build back-end services. Instead, they may have applications supported by the same back-end services that support the entity's website.

Some embodiments provide benefits and participation incentives to both service providers and users. Having website builders create service interfaces is beneficial to entities wishing to have a comprehensive online presence that includes application ecosystems. Such entities may select and enable service interfaces they desire their website to support. From the perspective of organizations that provide website builders and web hosting services, some embodiments provide an incentive for users to use their services and also provide an additional revenue opportunity based on charging for the application service enablement capability as a value-added service. From the perspective of non-website-builder widget providers, such providers benefit from others installing their widgets and using their back-end services in a variety of contexts that might otherwise be unavailable to such providers. From the perspective of users in application ecosystems, their interactions are greatly simplified, because they may use just a few functional applications instead of a plethora of applications as in the current application ecosystem model. From the perspective of Domain Name System (DNS) registrars, the reliance of some embodiments on a domain name as an entity identifier makes domain names relevant in application ecosystems.

These and other features and advantages are described in detail herein.

Figure 1:
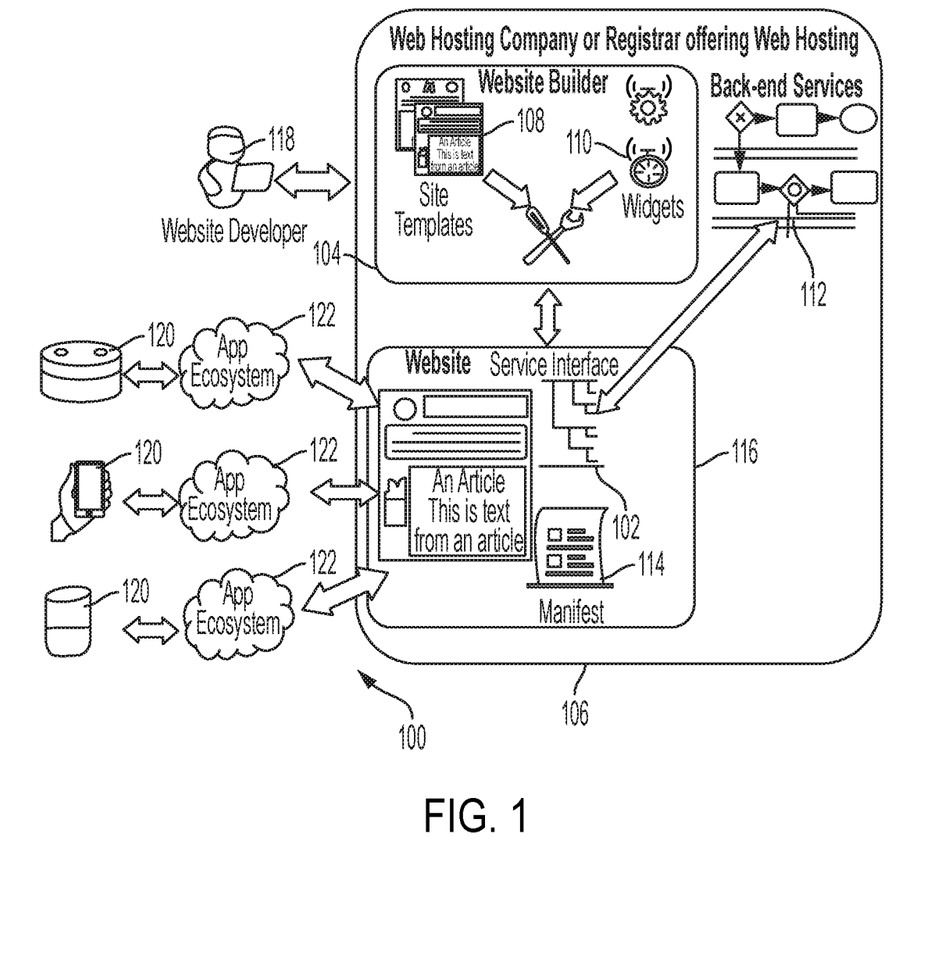
FIG. 1 is a hybrid system/flow diagram of a system and method for providing and using an internet application universal service interface according to various embodiments.

FIG. 1 is a hybrid system/flow diagram of a system 100 and method for providing and using an internet application universal service interface 102 according to various embodiments. System 100 may be implemented by a website hosting service 106 (e.g., a DNS registrar may provide such hosting services) through one or more server computers. According to various embodiments, such a website hosting service 106 may make available to website developers 118 a specialized website builder 104 that provides specialized website templates 108 and widgets. Such templates 108 may be modified to include code, such as widgets 110, that invoke and interact with back-end services 112. Such code, e.g., widgets 110, may be inserted into websites not limited to those built using the templates 108. Moreover, the website builder 104 may provide (e.g., generate) a universal service interface 102 through which such website code, as well as external applications, may invoke and interact with the back-end services 112. A manifest 114, on or associated with the website 116, provides information about the universal service interface 102 and its associated back-end services 112. Thus, some embodiments provide universal service interfaces 102 through which applications 120 in a variety of application ecosystems 122 may utilize back-end services 112 of a website 116 built using the website builder 104. In this manner, usage of the back-end services 112 is not restricted to the website 116 itself by way of, for example, its own graphical user interface, but rather provided to any application 120 in any application ecosystem 122 that complies with the specifications provided in the manifest 114.

According to an embodiment, application developers 118 may develop "functional apps", which interact with any website that provides the specific universal service interface that is used by such functional applications (e.g., as opposed to applications that are specific to a particular website). For example, a given application ecosystem 122 may have a single functional application for ordering food and a single functional application for scheduling appointments, where such applications may be used with any website equipped with the appropriate universal service interface, e.g., service interface 102, as disclosed herein. Of course, more than one functional application may exist in a particular application ecosystem, but more than one in each functional category (e.g., food ordering, appointment scheduling, etc.) may be somewhat redundant. Functional application users may identify to the functional applications the entity to interact with by identifying the domain name associated with the entity. The domain name may be identified directly by input by the user, or may be identified based on various other methods that can resolve the domain name of the entity. For example, the user may speak the domain name, the user may speak a business name or keyword that is then mapped to the domain name, the user may use an Internet search that identifies with some certainty the domain name, the user's context may inform the identification of the domain name, the user may have explicitly identified a set of domain names that can be considered, etc.

For example, a pizza chain website may configure their website with a universal service interface for ordering food. This may allow food ordering functional applications to order food by interacting with the website and the application's user. Further, a different pizza chain, or any restaurant whatsoever, may utilize the same functional application by outfitting its website with a compatible universal service interface. In another example, a professional such as a doctor may have their website provide a standard scheduling interface for use by scheduling functional applications, such as a voice application designed to let patients schedule appointments with their doctor. Again, any other professional may use the same functional application by configuring their website with a corresponding universal service interface as disclosed herein.

Once enabled, universal service interfaces can be used by applications, bots, voice assistants and other applications to interact via network communications with the website to programmatically perform functions defined by the website template and/or widgets, provided by a universal service interface, and implemented by corresponding back-end services. Further, embodiments may be used to facilitate communications in any application ecosystem, not limited to voice assistants and user devices. According to some embodiments, the universal service interfaces may be defined to service specific types of client applications, such as voice assistants and chatbots, so as to enable a website to provide specific tailored services to those types of client applications. As a further example, functional applications may be utilized to facilitate machine-to-machine communication across the Internet. For example, an entity might want to provide a service interface for wholesale product ordering that a functional artificial intelligence inventory control batch application accesses to do automatic re-ordering of low-stock items.

According to an embodiment, instead of having a one-to-one correspondence between applications and entities to which the applications are applicable, functional applications may interact with any entity that has enabled an appropriate universal service interface on its website. Websites equipped with universal service interfaces are cross-ecosystem in the sense that, using the techniques disclosed herein, they can interface with many different applications in a multiplicity of application ecosystems. Further, functional applications may be cross-entity in the sense that, using the techniques disclosed herein, any entity in any ecosystem can easily create a website that exposes its back-end services to such functional applications. Thus, websites that have universal service interfaces as disclosed herein and functional applications as disclosed herein are "many-to-many" in the above-described sense.

A website, such as website 116, may advertise the universal service interfaces that it supports via a manifest, such as manifest 114, by which services provided by the website are identified and associated with the domain name of the website. In some embodiments, a manifest may be a file posted on the website itself at some standardized end-point. In other instances, a manifest directory service, (e.g., a website or a registry service that is interacted with based on a known registry lookup protocol) may provide lookup services for identifying and retrieving manifests associated with a domain name, the entity associated with the domain name, based on a desired service interface, or based on an alias or other identifier associated with a domain name. That is, according to some embodiments, the manifest is stored at a service or website and associated with a non-domain-name identifier. In such embodiments, the manifest may be retrieved by searching based on a unique identifier associated with the entity to be interacted with. Such a unique identifier may be an object identifier, for example. According to some embodiments, the unique identifier may be discerned based on a combination of speaker recognition, background noise mapping to a location, and context.

A method for providing and using an internet application universal service interface 102 according to various embodiments is now described in reference to FIG. 1. To begin, the developer 118 may access the online website builder 104, e.g., using a browser, to create a website for a particular domain name. The developer 118 may either already have a domain name registered, or may purchase a domain name as part of the web site development process. Such a domain name may be considered to be a "brand" identifier that is strongly associated with the entity for whom the website is being developed. In some cases, the brand identifier may contain the name or trademark of the entity, such as a company name for a company website or an individual's name for a professional or personal website. Thus, in some embodiments, the website builder 104 provides a field into which the developer 118 enters a domain name that they have already registered. According to an embodiment, the website developer 118 may further provide a user interface for searching for, obtaining suggestions for, and registering a domain name. Such an interface may be provided, in particular, in embodiments in which the website hosting service 106 is also a DNS registrar.

In some cases, a desired identifier may not be available, or may not be available across all the Internet platforms for which the entity wants a unique identifier, such as a domain name within DNS and an identifier within various social sites and an application name within various application ecosystems. In such cases, the website builder may provide an interface for identifying a unique brand identifier that may be used as a domain name, social site identification, and/or application ecosystem identifier. To support this, the website builder 104 may interact with the DNS, social sites, and/or various application ecosystems to find identifiers unique across all the ecosystems, e.g., example.com for websites, @example for a first social media site, and socialmedia.tld/example for a second social media site. Such identifiers may serve as a brand identifier based on the entity's real-world identity or other aspects of the entity, or based on suggestions from the entity provided to the interface. (In this document, the notation ".tld" is a stand-in for any true top-level domain, such as dot com, dot net, dot edu, etc.)

Thus, a domain name may be registered, or a previously-registered domain name may be identified to the website builder 104.

The website developer 118 may also select a website template 108 for the website being developed and select widgets 110 for inclusion on the website. Widgets 110 may include, for example, an order widget and a scheduling widget. Note that the widgets 110 and other operators in the website templates 108 may utilize back-end services 112 to fulfill their functions. According to an embodiment, use of widgets allows the website developer 118 to intentionally select or determine that they want to support a specific type of functional application. Widgets may be developed and provided by the provider of the website builder 104. Alternately, or in addition, functional application providers may develop and provide widgets that can be used with the website builder 104. Regardless of the developer, the provided widgets interact with back-end services provided by the website builder 104, or even by third parties.

The developer 118 may also request that the website builder 104 include a universal service interface 102 for the website 116. This generates or otherwise adds to the website 116 the universal service interface 102. The website builder selects a universal service interface 102 to be appropriate to the developer-selected website template. Alternatively, according to some embodiments, some templates include a service template as part of the template, such that there is no need for the website developer 118 to explicitly indicate they want the service interface beyond the initial selection of the template.

According to various embodiments, the universal service interface may be an Application Program Interface (API). According to various embodiments, the API may be a Representational State Transfer (REST) API, a queuing API, or a Simple Object Access Protocol (SOAP) interface.

Regardless of the type, the universal service interface allows applications 120 to programmatically perform some function appropriate to the selected website template. For instance, if a pizza restaurant template is being used, then the interface may be a standard pizza ordering interface. For a professional such as a lawyer or accountant, the universal service interface may be a standard appointment scheduling interface. Thus, the universal service interface 102 provides the functions to support an application 120. For example, a universal service interface for a pizza restaurant webpage may support authentication and authorization, retrieving of the menu, selection off the menu, submission of an order, acceptance of payment mechanism, and status updates.

The website builder 104 next may provide a manifest for the website 116, identifying the universal service interface 102. For example, so that applications 120 (and application developers) can determine whether or not a given website provides a particular universal service interface, the APIs supported by a website may be listed in a manifest that is at some standard endpoint on the website. For example, a pizza ordering interface on NVAPizza.tld generated by website builder betterwebexperiences.tld might be listed in a manifest at endpoint http://NVAPizza.tld/apis/manifest as "betterexperiences.tld:api:pizzaordering-1.0". This name represents that the universal service interface conforms to the "pizzaordering-1.0" API provided by the specialized website builder on betterexperiences.tld. Note that betterexperiences.tld may publicly post documentation about this, and other, universal service interfaces for website and application developers to consider and utilize.

According to some embodiments, access to the service interface is configurable such that only applications from authorized ecosystems, or specific functional applications may be used interact with the service interface. One benefit of this approach is for the website and/or web-hosting company and/or the website builder to be able to do granular charging for enabling use of the service interface from specific market segments.

Once the service interface is in place, the manifest is provided, and any desired authorization barrier is in place, the website development process may be complete and the website 116 may be deployed.

After the website 116 development and deployment is finished, a user of a compatible functional application, e.g., application 120, may utilize the website 116 by identifying a domain name for the website to the functional application in any of a variety of ways (e.g., speaking the name, speaking search terms that identify the name with a high level of confidence, identifying the name from user context, the user following the name. etc.). As described above, functional applications are applications that allow an end-user to perform a specific function against some target entity identified to it, e.g., by way of a domain name, if the target entity provides a universal service interface that is compatible with the functional application. For example, a pizza voice ordering functional application "Pizza Fast" may allow a user to voice order a pizza from any website, e.g., NVAPizza.tld as described above, that provides the pizza ordering API interface that is supported by Pizza Fast. If Pizza Fast supports the "betterexperiences.tld:api:pizzaorder-1.0" API, then it is able to order from NVAPizza.tld.

A user may utilize a functional application 120 to interface with the developed website of FIG. 1 as follows. Upon initializing a functional application 120 in any application ecosystem 122, and on an appropriate user device for the respective ecosystem 122, the application user may input the domain name for the website 116 developed to provide a universal service interface. Other techniques for identifying the domain name to the functional application 120 are possible in the alternative. Some possible techniques include the user speaking the domain name to a voice assistant in a voice assistant ecosystem, a user selecting a domain name off a fixed list in a visually-oriented application ecosystem, and the application conducting a web search for a domain name based on a user-provided entity or business name. In the latter instance, the web search may utilize an existing search engine and pick a top result, e.g., if it exceeds a predetermined confidence level. Further embodiments may identify the domain name by, for example, but not limited to, using the user's current context, including any, or a combination, of location, time, what the user has recently been doing, or knowledge of characteristics of the user. Such context information may cause the system to propose one or more domain names for selection by the user, or may cause the system to select a domain name with the highest probability of being selected by the user. Yet further embodiments may identify the domain name from a list of names followed by the user, as described below (see Section III(E), below). Yet further embodiments may identify the domain name from the user's history with the functional application, which may record domain names previously identified and present them to the user for selection, or may automatically select the most recently used domain name.

Next, the application 120 may contact the website, or other location, if applicable, to provide any required authorization proof and retrieve the manifest 114. If the manifest identifies that the website supports a service interface that is supported by the application 120, then the application 120 may interface with the website's service interface 102 to provide functionality to the user particular to the website 116.

In particular, service requests from the application 120 may be fulfilled by the service interface 102 interacting with the same back-end services 112 that the website user interface uses. In general, when in use, a functional application accepts user input and maps it to an API call available from the service interface 102. Such capabilities may be provided by existing mechanisms, such as dialogue definition and machine learning mechanisms use by commercial voice assistant platforms.

II. Derivative Domain Names and Derivative Websites

To support use of the universal service interfaces and allow application users to directly specify a sub-entity for an application to operate on, additional derivative branded domain names may be identified. According to some embodiments, such domain names may be purchased during a domain name purchase flow or during development of a website using a website builder, e.g., website builder 104 of FIG. 1. The derivative domain names may then be used to interact with a website or service interface identified by a main brand domain name. In some embodiments, a user interacting with an online domain name suggestion and/or registration tool (which may be part of, or utilized by, the website builder 104, may pick a first domain name as the main brand domain name, and then be given an opportunity to pick additional domain names to register where the additional domain names are derived from the main domain name and where the main domain name may be a component of the derived domain names.

In an example where derivative domain names are based on a business's branch locations, a developer may select as a domain name for a pizza website, "NVAPizza.tld". The domain name suggestion/registration tool may then identify that NVAPizza.tld has locations in Herndon and Reston. The domain name suggestion/registration tool may suggest that "NVAPizzaHerndon.tld" and "NVAPizzaReston.tld" be purchased. Other techniques for defining derivatives include: based on a department within an organization, based on a function that could be provided by the entity, based on a role in the company such as chief technology officer, based on organization membership or identification in other systems, or any other identifier that could be strongly related to the brand. Other methods for defining derivative domain names may rely on types of aspects rather than specific aspects, such as derivations that use a social media identifier in the derivation without specifying the identifier of the entity within the social site, for example, NVAPizzaExampleSocialMediaSite.tld.

Using derivative domain names, as disclosed in embodiments described herein, has the advantage of being able to customize an application user's experience based on the derivative domain names, while only configuring a universal service interface on a single, main, website. In particular, websites for the derivative domain names may redirect to the website for the main brand domain name. When receiving a redirect from a derivative domain name website, the universal service interface receiving the redirect can detect the derivative portion of the domain name and use this information to inform the service to perform specific processing based on the derivative portion. For instance, a derivative domain name based on "NVAPizza.tld" and containing a location, such as "NVAPizzzaHerndon.tld", may be processed such that the receiving service receives data indicating that the incoming request is applicable to the Herndon location of NVA Pizza. In another example, a service that returns identifiers the organization "Example.tld" uses on social platforms may, when processing "ExampleSocialMediaSite.tld", recognize "SocialMediaSite" as the social service for which an identifier is being requested.

Figure 2:
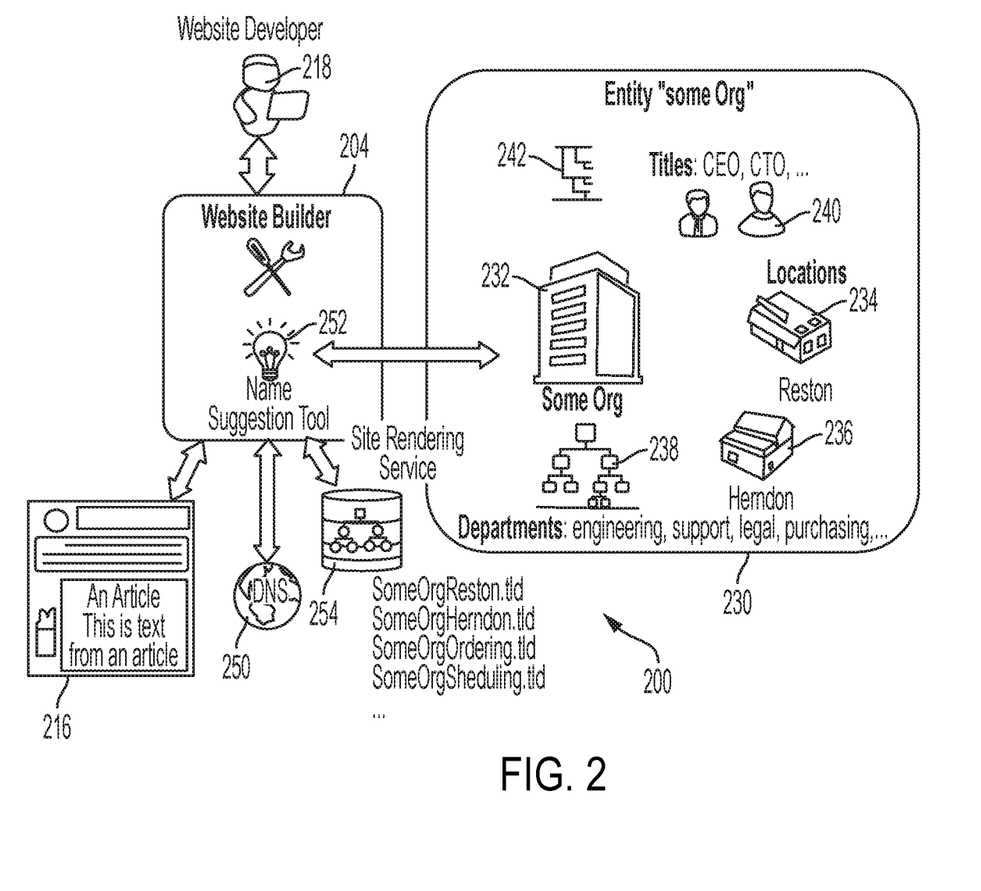
FIG. 2 is a hybrid system/flow diagram of a system and method for providing derivative domain names for use with an internet application universal service interface according to various embodiments.

FIG. 2 is a hybrid system/flow diagram of a system 200 and method for providing derivative domain names for use with an internet application universal service interface according to various embodiments. System 200 includes a website builder 204, which may be the website builder 104 as shown and described in reference to FIG. 1. A website developer 218 may interact with the website builder 204 to develop a website 216 with a universal service interface as shown and described above in reference to the website developer 118 of FIG. 1. In particular, the website builder 218 of system 200 includes a domain name selection and registration tool 252, which is communicatively coupled to DNS 250. This permits the website developer to sell domain names to the developer 218 during the website development process. This is particularly suitable for embodiments in which a DNS registrar provides the website builder 204.

In reference to FIG. 2, the developer 218 is shown as developing a website 216 for the entity "Some Org" 230. The entity, Some Org 230, has a headquarters 232 as well as a Reston location 234 and a Herndon location 236. Some Org 230 has various departments 238, such as engineering, technical support, legal, purchasing, etc. and employees 240 such as a chief technology officer and chief executive officer. Some Org 230 provides or offers functions 242 such as ordering, scheduling, verification, tracking, payment, etc.

A description of an example usage of the system 200 by the developer 218 to provide derivative domain names for use with a universal service interface for a main brand domain name follows. The process may begin while, or after, the developer 218 has developed the main brand website 216 for Some Org that has a universal service interface.

The developer 218 may wish to provide domain names corresponding to the Reston location 234 and the Herndon location 236 of Some Org. The developer 218 thus invokes the domain name selection and registration tool 252. The name suggestion tool 252 may accept as an initial input the domain name for the main brand website, e.g., SomeOrg.tld. The name suggestion tool 252 may scrape the website or use some other source to identify locations 234, 236, functions 242, departments 238, employees 240, and/or other aspects of Some Org. According to some embodiments, the domain name selection and registration tool 252 accepts as a subsequent user input various keywords that may be used to form derivative domain names.

In turn, the domain name selection and registration tool 252 uses the scraped or otherwise provided keywords to generate name suggestions (e.g., SomeOrgReston.tld, SomeOrgherndon.tld, SomeOrgPayments.tld, etc.). The developer 218 then selects one or more derivative domain names for registration. The developer 218 may then set up the derivative domain names in a website rendering service 254 that will redirect requests for websites of any of the derivative domain names to the universal service interface of the main brand website, SomeOrg.tld.

The derivative domain name may be used to redirect only, or may have a website associated with it. Such a website may be a subset of the website of the primary domain, or may be a website that is tailored to the purpose of the derivative. For example, a derivative pizza website based on location may, according to some embodiments, display a local map, advertise specials for that location, provide hours, and provide just the corporate information pertinent to the location. The website may also have a stubbed service interface that redirects to the central website, or may annotate incoming service requests to identify the primary website and then directly interact with back-end services.

This may conclude the development phase of providing derivative domain names for use with an internet application universal service interface.

Figure 3:
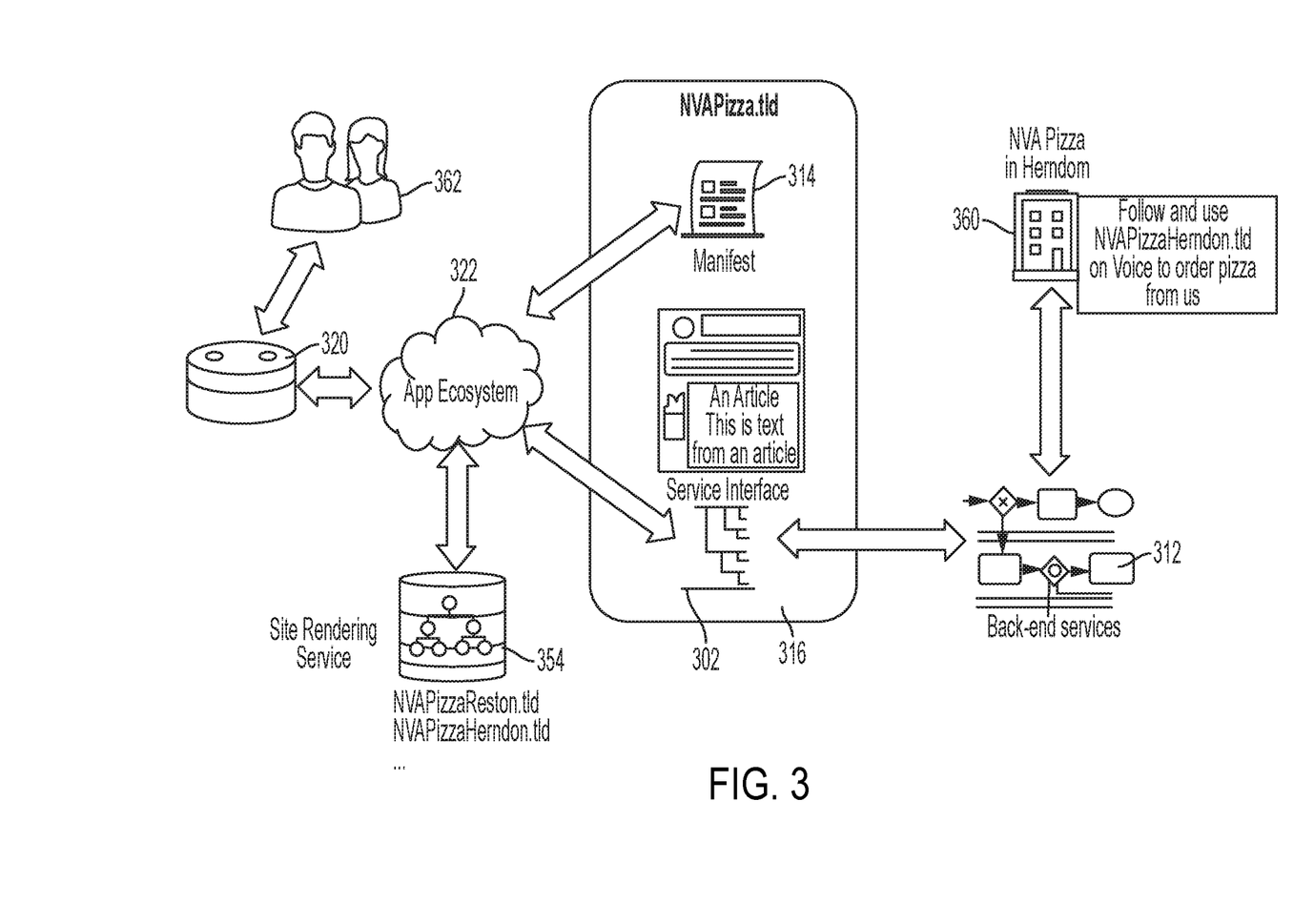
FIG. 3 is a hybrid system/flow diagram of a system and method for using an internet application universal service interface with derivative domain names according to various embodiments.

FIG. 3 is a hybrid system/flow diagram of a system 300 and method for using an internet application universal service interface with derivative domain names according to various embodiments. As shown in FIG. 3, the system 300 includes a website 316 for the main domain name NVAPizza.tld, which has a universal service interface 302 to back-end pizza ordering services 312 as shown and described herein in reference to FIGS. 1 and 2. The website 316 also has a corresponding associated manifest 314. The organization NVA Pizza corresponding to the main domain name NVAPizza.tld has a particular Herndon location 360, which is associated with the derivative domain name NVAPizzaHerndon.tld, which has been set up as shown and described above in reference to FIG. 2.

In particular, the system 300 is shown as having a website rendering service 354 set up to redirect requests for the derivative domain name NVAPizzaHerndon.tld to the main domain name, NVAPizza.tld. Other server-side redirect mechanisms may be used, such as DNS CNAME records, according to various embodiments. In other embodiments where a site rendering service is not used, requests to service endpoints for a website for the derivative domain may have the server for the derivative domain respond with redirects to the main domain name. Regardless of the method used for redirection, some embodiments assure that the use of derivative domain names does not have an impact on search engine optimization for the main brand domain name; see Section III(D), below.

In some embodiments, a client application may detect that services should be provided by a website (referred to herein as the "service website, due to its performing services) other than the website for an identified derivative domain name. In such embodiments, after detecting that a service website is to be used, the client application may determine the domain and path of the service interface to the service website and then send future requests related to the derivative domain to the service interface of the service website. In order to detect that a service website is the provider of the correct service interface, the client may detect some explicit or implicit indicator that it should use the service website. There are a number of ways this could be indicated to the client application. For example, the response to a service request to the website for the derivative domain may identify the service website.

In another example, a manifest for the derivative domain may indicate the service website to be used. An example manifest is presented below.

{"ServiceInterface": "pizzaOrdering.v.1.1",
  "ServiceProvider": {
    "domain": "NVAPizza.tld",
    "servicePath": "/api/pizzaOrdering/v1.1/"
  }
}

An example JSON response to a service request is presented below.

{"ServiceProxy": "true",
  "ServiceProviders": {
    "provider": "NVAPizza.tld", {
      "ServiceInterface": "pizzaOrdering.v.1.1",
      "servicePath": "/api/pizzaOrdering/v1.1/"
    }
  }
}

An example processing flow for embodiments that utilize such a manifest is disclosed presently. To start, the client retrieves the manifest from NVAPizzaHerndon.tld, for example. Next, the client scans manifest for the "ServiceInterface" definition. The client processes the "ServiceInterface" element and, from the "ServiceProvider" provider element, determines that the "domain" for service requests is "NVAPizza.tld" and the "servicePath" is "/api/pizzaOrdering/v1.1". The client then combines the identified domain and servicePath to create a base URL for service requests relative to NVAPizzaHerndon.tld as "HTTPS://" prepended to "NVAPizza.tld/api/pizzaOrdering/v1.1". The client sends the service requests to the base URL and path segments that extend the base URL.

A processing flow for the JSON response may be similar, except that the client starts by examining service request responses to see if they have "ServiceProxy" as "true", with this indicating the client is to process the rest of the response to determine the base URL of the service website and then re-do the request using that base URL.

According to some embodiments, a functional application or redirection service may verify that a derivative domain name is owned or legitimately associated with the entity owning the main brand domain name. In such embodiments, access to domains squatting (i.e., registered in bad faith with the intent to profit from the goodwill associated with a trademark belonging to someone else) on the main brand domain name may be blocked when the application or redirect service determines that a requested derivative domain is not associated with the brand domain it is a derivative of.

A description of a usage of system 300 by application user 262 is provided presently. As shown, application user 362 has an application 320 in application ecosystem 322. The application user 362 may become aware of the Herndon location 360 of NVA Pizza through any of various channels (e.g., a physical sign, an internet advertisement, etc.). The application user 362 learns from such channel that the Herndon location 260 of NVA Pizza supports ordering pizza using a functional application (e.g., a voice assistant application) with parameter NVAPizzaHerndon.tld as disclosed herein.

The application user 362 then directs their application to order a medium cheese pizza for pickup from NVAPizzaHerndon.tld. The application user 362 may do so, for example, by speaking "order a medium cheese pizza for pickup from NVAPizzaHerndon.tld" to a voice assistant, according to some embodiments. The application 320 then attempts to retrieve a manifest from NVAPizzaHerndon.tld, and is redirected by the website rendering service 354 to NVAPizza.tld, where it retrieves the corresponding manifest 314. Alternately, according to some embodiments, a manifest for NVAPizzaHerndon may be used and stored on the NVAPizzaHerndon website or in a registry and associated with domain name NVAPizzaHerndon.tld. The application 320 parses the manifest and determines that NVAPizzaHerndon.tld supports a particular pizza ordering universal service interface 302 that the application also supports. The application 320 then sends a request corresponding to the application user's 362 order to NVAPizzaHerndon.tld, which the website rendering service 354 redirects to the ordering universal service interface 302 of NVAPizza.tld. The website 316 for NVAPizza.tld, particularly the universal service interface 302, receives and parses the request and determines that it went through NVAPizzaHerndon.tld and was redirected to NVAPizza.tld. It may make this determination in any of a number of ways. According to some embodiments, where service requests are made using the HTTP 1.1 protocol, the "Host" request header for the received HTTP request may be used to determine the name of the originally requested domain name. Once the determination is made, the website for NVAPizza.tld initiates the order at the NVAPizzaHerndon.tld location. Subsequently, the webpage 316 for NVAPizza.tld returns status information to the ordering application 320, which provides such status information to the application user 362 (e.g., for voice assistant ecosystems, by providing an audible representation of the status information for the application user 362).

III. Variations and Generalizations

This section describes various embodiments consistent with those shown and described above in reference to FIGS. 1-3.

A. Branded Applications

Some embodiments provide branded applications, that is, applications that are dedicated for a single brand via a website with a universal service interface. According to an embodiment, branded applications provide capabilities enabled by interacting with the standard service interfaces of the brand's website. In such embodiments, the website builder may be used to create such branded applications. These branded applications can then be provided through an application ecosystem (e.g., via an application marketplace) as a way of providing a brand presence within that application ecosystem. According to an embodiment, in branded applications as described, once developed by the application developer, there may be no need to provide a domain name to a branded application because the branded application could inherently know the domain name to be interacted with.

B. Generalizations Beyond Domain Names

Embodiments described above in reference to FIGS. 1-3 for facilitating applications to interact with universal service interfaces for websites are generalizable to cover universal service interfaces provided by cloud services or other platforms capable of providing service interfaces. According to an embodiment, although some embodiments use a domain name and website as the model for identifying and delivering a service interface for functional applications to interact with, this model is generalizable to other platforms that use unique identifiers to identify specific instances of service interfaces applicable for an entity associated with the unique identifiers. Thus, some embodiments encompass generalizations that are applicable to providing identifiers other than domain names. For example, an entity may want to enable food ordering functional applications to interact with a food ordering service provided on a cloud or web service. Accordingly, a service builder can fulfill a role analogous to that provided by the website builder (e.g., website builder 104, 204) as disclosed herein. In this case, the entity wishing to offer the service may use the service builder to facilitate template services provided by the cloud service or other provider and then configure and customize enabled services. This is analogous to how a website builder is used configure and customize a website that is based on a website template and how a website builder may be used to configure and customize a universal service interface. Such embodiments also support automated generation of branded applications that can interact with services created by the service builder.

For example, the entity "NVA Pizza" may want to enable a presence in a voice application ecosystem by using a service builder to generate both a branded "NVA Pizza" voice application and a universal service interface needed by the "NVA Pizza" application, where the standard service interface is provided by the cloud infrastructure applicable to the service builder.

C. Voice Interfaces

According to some embodiments, at the time a universal service interface is generated by the website builder to allow voice functional applications to interact with a website, the website builder may also generate or configure a voice interface that can be used on the website itself to perform the same function. For example, NVAPizza.tld might configure a voice interface that allows customers to order a pizza by speaking the order. A benefit to providing the voice interface through the website is that voice interaction is then facilitated from any platform that provides a voice-enabled browser that can connect to the website. For example, such platforms may include smart phones, tablets, laptops, laptop computers, and desktop computers.

According to some embodiments, a website builder that provides the website's voice interface as part of a progressive web application may provide additional capabilities and benefits above and beyond those provided by a voice interface on a non-progressive-application website. Such capabilities include the ability to install the website as an application on mobile devices, providing background notifications, and allowing the website to push promotions and updates to the device even when the user is not using the application. According to an embodiment, the use of progressive web applications is not limited to voice ecosystems as disclosed herein.

D. Derivative Domain Names, Derivative Websites, and Search Engines

Entities owning derivative domain names (see Section II, above) may want such domains to appear in search results in voice ecosystems where search is used to identify applications and entities. In such cases, a website builder might insert meta-data, content, and/or tags into a website for the derivative domain name to support searching from voice ecosystems. A website builder might also provide a manifest for the derivative domain in the form of a webpage that facilitates search engines crawling the derivative domain website to determine that it is not only voice enabled but also to discover the services offered by the domain. Search engines may also be configured to crawl manifests in other formats and posted at standard endpoints under the domains, for example a JSON manifest named "voiceservice.json" that is placed in the root folder of a website. Search engines may also crawl manifest directories provided by service providers. In addition to the elements in a manifest that advertise available services, other elements of the manifest may be used to influence the search engine optimization of the domain within an application ecosystem. For example, an element in a manifest may identify a locale so that search engines rank the domain higher when it matches searches from users in the locale.

A potential pitfall in the generation of brand derivative second level domain names is negative impact on search engine optimization for the brand domain name. In particular, some search engines penalize websites in their ranking determinations when such websites are linked to from other websites that redirect to them.

To counteract this, an indicator in the manifests for derivative domain names may be used to inform search engines that the domain names are strictly there to support applications in an application ecosystem and therefore should only be part of search results related to an application ecosystem.

Another technique for informing search engines includes using entries in robots.txt files for the brand derivative domain names. Such entries may indicate to search engine crawlers that they should not associate the derivative domain names with the main brand domain name when determining search engine optimization. In case a search engine crawler does not crawl manifests and does not process entries in robots.txt indicating the derivative domain's purpose is to support application ecosystems, standard entries in robots.txt may be used to tell search engine crawlers to avoid crawling the domain altogether. This also prevents the association of the derivative domains with the brand domain name. This approach might have the side-effect of preventing the derivative domains from showing up in web search results. Given that derivative domain names are meant for explicit use as direct identifiers with applications, such as when a functional application is used to order a pizza from "NVAPizzaHerndon.tld", the exclusion of derivative domain names from web search results might not significantly impact the intended utility of the derivative domain names.

According to some embodiments, a derivative domain name may be used for a localized website that has sufficient independence from the main brand website that it has its own SEO and does not impact SEO for the main brand website.

E. Derivative Domain Names and Following

To better facilitate voice application user interactions, such users may "follow" brand derivative domain names within such applications to improve recognition of such names. For example, a search-based mechanism of a voice application that launches a functional ordering application may process the input "NVA Pizza in Herndon", detect the location "Herndon" in the input, detect that the user is following "NVAPizzaHerndon.tld", and connect the "Herndon" location specified in the search with the derivative portion of the domain name. The search processing may therefore determine with a high probability that NVAPizzaHerndon.tld is the domain to have the functional ordering application interact with. Should the user not be following "NVAPizzaHerndon.tld", the search processing may still detect it as the target domain, e.g., based on previously detecting that NVAPizzaHerndon.tld supports the ordering interface needed by the functional ordering application, and also having previously determined that the domain name is a brand derivative with the "Herndon" portion of the domain name denoting a location of the brand. For a user to follow a derivative domain name (or any domain name), the user may, before a subsequent direction to utilize the name, provide the name to a follow function of the application. That is, the application may have a follow function that accepts domain names for the purpose of better recognizing such names in the future.

F. Third-Party Widget & Back-End Service Providers

According to some embodiments, widgets and/or templates are provided by an entity other than the website builder provider. For example, such an entity might wish to provide one or more widgets and back-end service(s) for ordering movie tickets. The entity might have a business relationship with one or more movie theatre companies, such that the entity's back-end services include the ability to purchase movie tickets. The entity may make its widgets publicly available, or available to a select set of other entities for inclusion in their websites. For example, a movie critic website might wish to include such a movie ticket ordering widget (or widgets) in their website. The widget provider benefits from others, who might not otherwise be exposed to their services, using their services. The movie critic website benefits from providing its users with additional services. Note that an administrator of the movie critic website may easily obtain and insert such a widget into the site. This allows such entities to easily benefit from providing such additional services, without requiring difficult application development, for example. Embodiments as described in this section are not limited to movie ticket purchasing widgets; other such embodiments may be for ordering food, making restaurant reservations, selling personal property, etc.

G. Universal Service Interface for Multiple Websites

According to some embodiments, the website builder provides a universal service interface that is used across multiple websites, and that the website that a particular service request is applicable to is identified in the service request. Such embodiments may provide the universal service interface on a dedicated website, which is utilized by a plurality of other websites. Such embodiments are distinct from embodiments in which a universal service interface is created only for a particular website.

Embodiments that include a universal service interface for multiple websites may operate as follows. A given website might establish a redirecting service that redirects service requests to the website that includes the multiple-website universal service interface. When a user invokes a service at the given website using the user's application, an interface at the given website redirects the service request to the universal service interface on the dedicated website. According to alternative embodiments, a functional application may be configured to interact with the multiple-website universal service interface and identify the applicable domain in requests made to that service.

Embodiments that include a multiple-website universal service interface may include authentication and/or authorization processes to protect such a service interface from unauthorized access. Such processes may include providing a pre-shared secret, which may be encrypted, with each service request. Other such processes may utilize authentication tokens, for example.

IV. Example System Implementations

Figure 4:
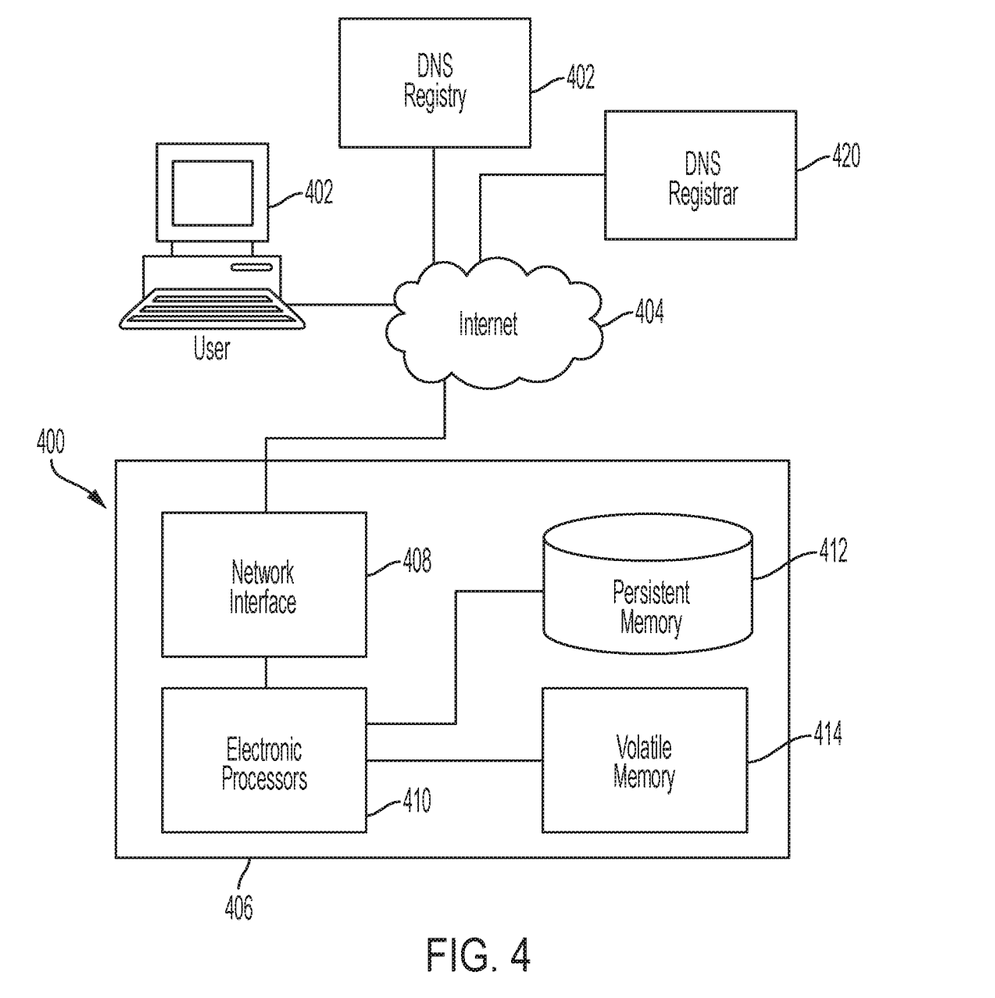
FIG. 4 is a schematic diagram of a system suitable for implementing methods according to some embodiments.

FIG. 4 is a schematic diagram of a system 400 suitable for implementing methods according to various embodiments disclosed herein. As shown in the example of FIG. 4, system 400 may be based around an electronic hardware internet server computer 406, which may be communicatively coupled to the internet 404. Server computer 406 includes network interface 408 to affect the communicative coupling to the internet 404. Network interface 408 may include a physical network interface, such as a network adapter. Server computer 406 may be a special-purpose computer, adapted for reliability and high-bandwidth communications. Thus, server computer 406 may be embodied in a cluster of individual hardware server computers, for example. Alternately, or in addition, server computer 406 may include redundant power supplies. Persistent memory 412 may be in a Redundant Array of Inexpensive Disk drives (RAID) configuration for added reliability, and volatile memory 414 may be or include Error-Correcting Code (ECC) memory hardware devices. Server computer 406 further includes one or more electronic processors 410, which may be multi-core processors suitable for handling large amounts of information. Electronic processors 410 are communicatively coupled to persistent memory 412, and may execute instructions stored thereon to partially or fully effectuate the techniques disclosed herein, e.g., the methods shown and described in reference to FIGS. 1-3. In particular, server computer 406 may provide a website builder such as the website builder 104 or 204. Electronic processors 410 are also communicatively coupled to volatile memory 414.

Server computer 406 is communicatively coupled to DNS registry 402 and/or DNS registrar 420. (According to some embodiments, server computer 406 is provided by a registrar and web hosting service for implementation of the disclosed methods.) The communication between server computer 406 and DNS registry 402 or DNS registrar 420 allows for determining whether suggested domain names are currently registered, and also permits users, such as the website developer 118 or 218, to register unregistered domain names as disclosed herein.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of providing a website configured for access from applications of different ecosystems, the method comprising:
   storing, by at least one electronic persistent memory communicatively coupled to a webserver communicatively coupled to a computer network, a plurality of website templates, wherein website templates of the plurality of website templates are each stored in association with a respective web widget and an Application Program Interface (API), wherein the web widgets each correspond to a respective service;
   receiving, by the webserver, a website template selection for the website, wherein the website template selection is from the plurality of website templates;
   receiving, by the webserver, a web widget selection for inclusion on the website, wherein the web widget selection is from the plurality of respective web widgets;
   providing, by the webserver, an API for the website based on the website template selection, wherein the website is configured to use the API to interface with the applications of the different ecosystems; and
   generating, based on the web widget selection, a manifest for a domain name associated with the website, wherein the manifest indicates one or more services associated with the web widget selection available from the website.

2. The method of claim 1, wherein the applications of the different ecosystems are configured to interface with the website based on the domain name associated with the website.

3. The method of claim 2, wherein each of the applications of the different ecosystems include a respective input for an end user to select the domain name associated with the website.

4. The method of claim 1, further comprising providing a plurality of second websites for a plurality of derivative domain names, wherein the plurality of second websites are configured to redirect to the domain name associated with the website.

5. The method of claim 4, further comprising suggesting the plurality of derivative domain names for registration.

6. The method of claim 1, wherein the plurality of website templates comprise at least one of: a food ordering website template, an appointment scheduling website template, a shopping website template, a service ordering website template, a scheduling website template, a customer support website template, or an information request website template.

7. The method of claim 6, wherein the website template selection comprises a food ordering website template, and wherein the web widget selection comprises a payment widget and a menu selection widget.

8. The method of claim 1, wherein at least one application of the applications of the different ecosystems comprises a voice enabled application in a voice assistant application ecosystem.

9. The method of claim 1, further comprising storing the manifest on the website.

10. The method of claim 1, wherein the manifest for the domain name is accessible by a client to determine one or more services supported by the website.

11. A system for providing a website configured for access from applications of different ecosystems, the system comprising:
    at least one electronic hardware webserver communicatively coupled to a computer network and to at least one electronic persistent memory storing a plurality of website templates, wherein website templates of the plurality of website templates are each stored in association with a respective web widget and an Application Program Interface (API), wherein the web widgets each correspond to a respective service;
    wherein the at least one webserver is configured to receive a website template selection for the website, wherein the website template selection is from the plurality of website templates,
    wherein the at least one webserver is configured to receive a web widget selection for inclusion on the website, wherein the web widget selection is from the plurality of respective web widgets,
    wherein the at least one webserver is configured to provide an API for the website based on the website template selection, wherein the website is configured to use the API to interface with the applications of the different ecosystems,
    wherein the at least one webserver is configured to generate, based on the web widget selection, a manifest for a domain name associated with the website, wherein the manifest indicates one or more services associated with the web widget selection available from the website.

12. The system of claim 11, wherein the applications of the different ecosystems are configured to interface with the website based on the domain name associated with the website.

13. The system of claim 12, wherein each of the applications of the different ecosystems include a respective input for an end user to select the domain name associated with the website.

14. The system of claim 11, wherein the at least one webserver is configured to provide a plurality of second web sites for a plurality of derivative domain names, wherein the plurality of second websites are configured to redirect to the domain name of the website.

15. The system of claim 14, further comprising a name suggestion tool for providing the plurality of derivative domain names for registration.

16. The system of claim 11, wherein the plurality of website templates comprise at least one of: a food ordering website template, an appointment scheduling website template, a shopping website template, a service ordering website template, a scheduling website template, a customer support website template, or an information request website template.

17. The system of claim 16, wherein the website template selection comprises a food ordering website template, and wherein the web widget selection comprises a payment widget and a menu selection widget.

18. The system of claim 11, wherein at least one application of the applications of the different ecosystems comprises a voice enabled application in a voice assistant ecosystem.

19. The system of claim 11, wherein the at least one webserver is configured to automatically electronically store the manifest on the website.

\* \* \* \* \*